Dec. 29, 1959          E. MANN, JR          2,918,822

APPARATUS FOR TESTING AUTOMATIC TRANSMISSIONS

Filed Feb. 20, 1956          2 Sheets-Sheet 1

INVENTOR.
Earl Mann, Jr.
BY
ATTORNEY.

Dec. 29, 1959     E. MANN, JR     2,918,822
APPARATUS FOR TESTING AUTOMATIC TRANSMISSIONS
Filed Feb. 20, 1956     2 Sheets-Sheet 2

INVENTOR.
Earl Mann, Jr.
BY
ATTORNEY.

United States Patent Office 2,918,822
Patented Dec. 29, 1959

2,918,822

APPARATUS FOR TESTING AUTOMATIC TRANSMISSIONS

Earl Mann, Jr., Kansas City, Mo., assignor to Mann Automatic Transmission Company, Kansas City, Mo.

Application February 20, 1956, Serial No. 566,411

7 Claims. (Cl. 73—432)

This invention relates to apparatus for testing automatic transmissions and more particularly to a machine for testing such transmissions from which the fluid coupling or torque converter unit has been removed.

As is well known there are two principal types of automatic transmissions used in present day motor vehicles. Type I consists of a fluid coupling connected to a hydraulic controlled transmission, and type II comprises a combination torque converter and fluid coupling operably connected to a planetary gear box. Gear ratios of the planetary gear box in the second type may be changed either by a governor driven by the output shaft or varied by a manual lever operated by the driver of the vehicle.

In type II the converter coupling constitutes a complete automatic transmission within itself acting as an infinitely smooth automatic clutch plus an infinitely variable torque multiplier. The planetary gear box serves mainly to provide a neutral position, reverse gear and in some types an extra acceleration gear. However, in type I transmissions, the fluid coupling does not multiply engine torque but merely acts as a coupling between the engine and the wheels. It is to be pointed out here that the major constructional difference between a fluid torque converter and a fluid coupling is the addition of "reaction" or "stator" blading in the converter which makes it possible for the converter to multiply or increase applied engine torque.

In the typical torque converter type transmission, a primary pump is bolted directly to and driven by the flywheel within an oil filled housing attached to the forward end of the transmission casing containing the planetary gears, the pump also driving a front oil pump for distributing oil under pressure to the casing. The main input shaft extending from the transmission casing has a turbine splined thereto in facing relationshihp to the primary pump, and a stationary reaction shaft telescoped over the main shaft, but not as long, carries the primary and/or secondary stators mounted on one-way or overrunning clutches which hold the stators stationary when torque multiplication is needed, and allows them to rotate with the pump and turbine when the need for torque multiplication ceases. The oil within the bell housing passing from the primary pump causes the turbine to rotate first in reduction and finally at approximately a one to one ratio.

In the fluid coupling and hydraulic controlled transmission, on the other hand, the transmission contains generally two planetary gear sets arranged to provide four forward speeds as well as a third planetary gear set for reverse. Each of the planetary gear sets consists of a center or internal gear around which are disposed a plurality of planet pinions in engagement therewith and a drive gear encircling the planet pinions having internal teeth in engagement with the teeth of the planet pinions. A planet carrier is attached to each of pins on which the planet pinions are disposed. A clutch and band for each gear set, respectively, are provided for selectively controlling the relative rotation of the gears contained therein.

A torus cover is bolted directly to the flywheel of the engine for rotation at the same revolutions per minute as the engine. This torus cover is splined to a shaft externally of the transmission case, the other end of the shaft being attached in a suitable manner to the front drive gear for rotation therewith. This shaft also drives a fluid pump to operate the hydraulic mechanism within the transmission to apply and release the various clutches and bands associated with the planetary gear sets. A front planet carrier shaft telescoped within the front drive gear shaft is attached at one end thereof to the front planet carrier and has a drive torus attached to the other end thereof externally of the transmission case. A main input shaft is telescoped within the front planet carrier shaft and is attached to the rear internal gear of the rear planetary set, the external portion of the shaft having a driven torus attached thereto. It can thus be seen that when the torus cover driven by the flywheel is turning at a constant revolutions per minute and the front band is holding the front center gear against movement, the front planet carrier shaft is driven at a reduced speed from the engine r.p.m.'s. This is translated through the fluid medium within the coupling to the drive torus on the input shaft which in turn drives the rear center gear of the rear planetary set. If the rear band is holding the rear internal gear against movement then the output shaft attached to the pins of the associated rear planetary pinions is driven at a reduced speed from that of the main shaft. As is well understood, the various gear ratios of the transmission are obtained by applying the bands and clutches in different combinations.

When automatic transmissions are either newly manufactured or what is known in the trade as "remanufactured," it is desirable that they be tested to determine any type of mechanical failure or oil leakage prior to the time and effort of placing the transmission in an automobile and then having to replace it because of defective parts or assembly. It is manifest, however, that in order for the transmission to be properly tested it must be in a completely assembled form so that all of the operations ordinarily performed in the car may be carried out on the test bed. In the past the only method available of testing these transmisisons was to mount the engine of an automobile including the flywheel and its associated parts on some type of frame and then bolt the transmission including its torque converter or fluid coupler to the flywheel of the engine. Although in some instances this method might be practical, it is for the most part completely unsatisfactory for the reason that most transmissions, whether new or "remanufactured" are sold in the form consisting of the transmission casing only and do not include the fluid coupler and torque converter.

It is, therefore, the most important object of this invention to provide apparatus for testing automatic transmissions from which the torque converter or fluid coupling has been removed.

A further important object of this invention is to provide apparatus for testing automatic transmissions which requires a minimum amount of equipment and which testing process may be carried out in a short period of time without completely assembling the entire transmission and its associated parts.

Another important aim of this invention is to provide apparatus for testing automatic transmissions wherein there is provided tubular means for preventing relative rotation of a pair of the input shafts, a tubular sleeve adapted to engage another of the input shafts in encircling relationship to the tubular means, and power structure for driving the sleeve at a predetermined constant speed.

Also an aim of the instant invention is the provision of apparatus for testing automatic transmissions including tubular means for preventing relative rotation of the main input shaft and a front oil pump, a tubular sleeve adapted to releasably engage one end of the tubular means, and power structure for driving the sleeve at a predetermined constant speed.

Other objects of the present invention will become obvious as the present specification progresses.

Figure 1:
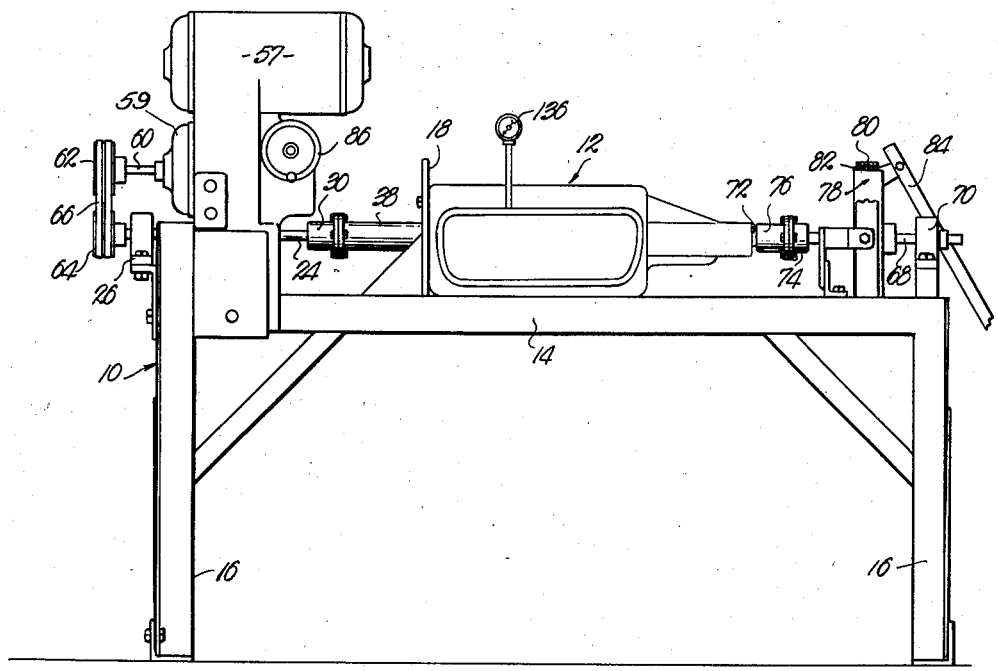
Figure 1 is a side elevation view of apparatus for testing automatic transmissions made pursuant to the present invention.
Figure 3:
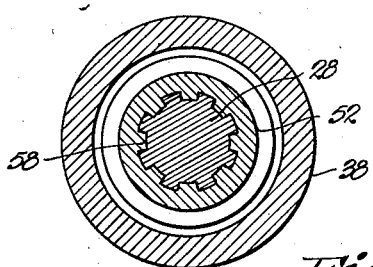
Fig. 3 is an enlarged cross-sectional view taken on the line III—III of Fig. 2.
Figure 4:
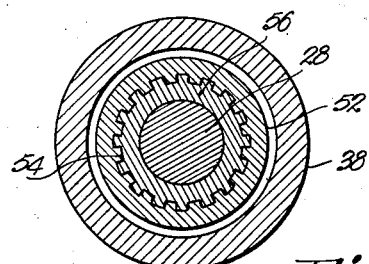
Fig. 4 is an enlarged cross-sectional view taken on the line IV—IV of Fig. 2.
Figure 5:
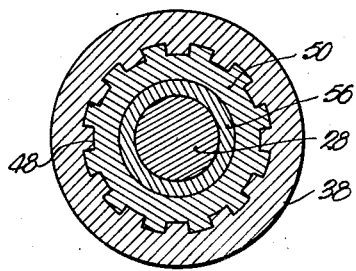
Fig. 5 is an enlarged cross-sectional view taken on the line V—V of Fig. 2.

In Figs. 1 to 5 inclusive there is shown apparatus broadly designated by the numeral 10 for testing automatic transmissions of the type employing a fluid coupling normally connected to transmission case 12 which includes various planetary gear sets. Apparatus 10 includes a horizontal elongated frame 14 supported by upright legs 16. An upright plate 18 located intermediate the ends of frame 14 is adapted to receive one face of the case 12 and includes an opening 19 therein to receive the front pump housing 20 of transmission casing 12. The casing 12 is bolted to plate 18 by virtue of stud bolts 22 to assure a firm fixing of the transmission to frame 14.

A shaft 24 is rotatably mounted on the end of frame 14 adjacent plate 18 by virtue of bearings such as 26, shaft 24 being in alignment with the axis of the main input shaft 28 of casing 12.

A flange 30 is secured to the end of shaft 24 proximal plate 18 by virtue of key 32 for rotation therewith. Flange 30 has an annular rim 34 which is adapted for securing the rim 36 of an elongated coupler sleeve 38 thereto, sleeve 38 being rigidly attached to flange 30 by a plurality of bolts and nuts such as 40.

Sleeve 38 extends into the opening 19 and has an internal cut away portion 42 the surface of which is adapted to engage the grease retainer seals 44 and 46 of front pump housing 20. An internal splined section 48 of sleeve 38 is adapted to engage the splines of front drive gear and pump shaft 50. Telescoped within sleeve 38 and free to float therein is a tubular member 52 having an internal splined section 54 adapted to engage the splines on front planet carrier shaft 56 and an internal splined section 58 adapted to engage the splines on main input shaft 28.

Prime mover 57 mounted on frame 14 is operably connected to gear box 59, and shaft 60 of gear box 59 has a pulley 62 thereon which is in alignment with a pulley 64 on the end of shaft 24, there being provided a plurality of endless V-belts such as 66 trained over pulleys 62 and 64.

A shaft 68 is rotatably mounted in bearings such as 70 which are in turn mounted on the end of frame 14 opposite from prime mover 57, shaft 68 being in alignment with the output shaft 72 of transmission casing 12. Secured to the end of shaft 68 proximal to casing 12 is a flange 74 similar to flange 30. Another flange 76 is removably attached to flange 74 and has internal splines adapted to engage the splined section of output shaft 72. A braking system is provided for stopping the rotation of shaft 68 and includes a flywheel 78 secured to shaft 68 and a brake band 80 having a liner 82 which may be applied to the flywheel 78 by virtue of handle 84.

It is now apparent that upon operation of prime mover 57 shaft 24 may be driven at a constant speed depending upon the gear ratio of gear box 59 which is variable by virtue of hand operated gear wheel 86, thereby driving sleeve 38 and the front drive gear and pump shaft 50 at the same speed. Assuming that the r.p.m.'s of shaft 24 are low enough to drive the entire transmission in complete reduction it can be seen that since the front planet carrier shaft 56 is driven at a reduced speed from that of front drive gear and pump shaft 50 and because of the fact that front planet carrier shaft 56 and main input shaft 28 are rigidly interconnected by virtue of tubular member 52, output shaft 72 is also driven at a reduced speed from that of tubular member 52.

Tubular member 52 is free to rotate within sleeve 38 but is secured against longitudinal movement on shafts 28 and 56 by a nut 88 screwed onto a reduced portion 90 of shaft 28. Therefore, after sleeve 38 has been secured to flange 30, tubular member 52 is slipped over shafts 28 and 56 into engagement with the splined sections thereon, nut 88 is screwed thereagainst and then transmission casing 12 is mounted on plate 18 in such a manner that splined section 48 engages the splines of shaft 50.

Figure 6:
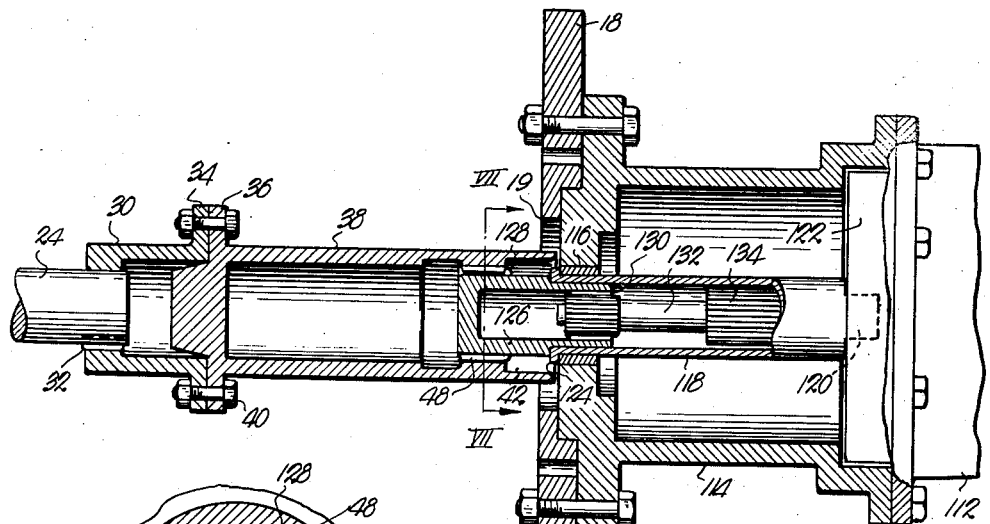
Fig. 6 is an enlarged, fragmentary view, partly in elevation and partly in cross-section of a modified form of coupler used in the testing of type II transmissions.
Figure 7:
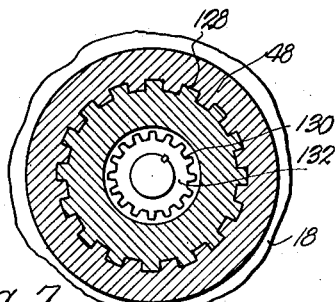
Fig. 7 is an enlarged cross-sectional view taken on the line III—III of Fig. 6 and looking in the direction of the arrows.
Figure 2:
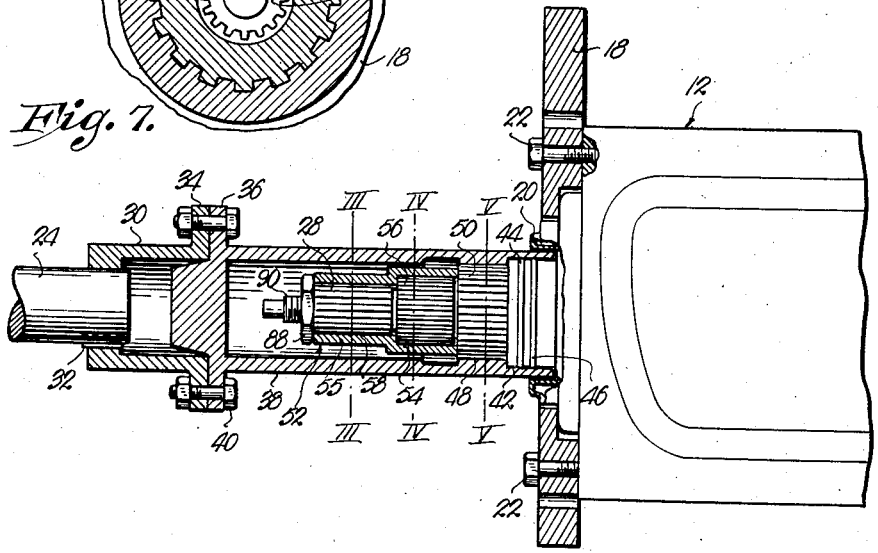
Fig. 2 is an enlarged, fragmentary view, partly in elevation and partly in cross-section, of one form of coupler used in connection with the testing of type I transmissions.

In Figs. 6 and 7 of the drawings is shown a form of the present invention adapted for testing automatic transmissions of the type consisting of a torque converter ordinarily connected to planetary gear box 112. A hollow cylindrical tube 114 is mounted on the face of plate 18 opposite from prime mover 57, the transmission casing 112 then being bolted to the outermost face of tube 114. Tube 114 has a bearing 116 mounted in the end adjacent plate 18 for rotatably supporting a cylinder 118 which has a pair of integral protuberances 120 on one end thereof adapted to engage corresponding notches of the front oil pump 122 of transmission casing 112. The opposite end of cylinder 118 has an external annular rim 124 which engages the front face of tube 114, thereby preventing longitudinal movement of the tube 118 in the direction of casing 112. Welded within and extending outwardly from that end of tube 118 proximal to plate 18 is a sleeve member 126 having an external splined section 128 which is adapted to engage the internal splined section 48 of sleeve 38. Sleeve member 126 also has an internal splined section 130 which is adapted to engage the splines of main input shaft 132. Main input shaft 132 is telescoped within the stationary reaction shaft 134 and cylinder 118 is of sufficient diameter to rotate freely around stationary reaction shaft 134.

Thus, upon rotation of shaft 24 at a constant speed it can be seen that main input shaft 132 and oil pump 122 are driven at a constant speed and the output shaft (not shown) of transmission casing 112 is driven at a variable speed.

From the foregoing it can now be appreciated that there is presented apparatus for testing all types of automatic transmissions, it not being necessary to install the transmission in an automobile or vehicle or to test the same by placing the torque converter or fluid coupling thereon. This is especially important for the reason that in testing transmissions of the type that are shifted hydraulically, it is possible to check the complete shift pattern absolutely because therewill be no slippage between shafts 58 and 56 which is normally present when the fluid coupling is placed on casing 12. Also, the testing process carried out by utilizing apparatus 10 will show up any gear noise in the transmission since such gear noise will not be rendered inaudible because of the usual engine noise associated with tests in the vehicle. Manifestly, there is very little noise incidental to the operation of prime mover 57 and gear box 59 other than the actual transmission itself. This is extremely important for the reason that in running the transmission through its various phases by checking the r.p.m. counter associated with prime mover 57, the test machine operator can listen for the shift changes in the transmission. Also, it is possible to check for any and all oil leaks from the transmission since it is placed in a position whereby all parts thereof can be examined in detail. If it is desired to check the oil pressure within the transmission, an oil pressure gauge 136 may be screwed into the proper orifice therein and the pressure determined throughout the entire shift pattern. Also it can be determined if there is any slippage whatsoever within the transmission, such as the bands around the drive gears surrounding the planetary pinions. Apparatus 10 is additionally of extreme utility in testing automatic transmissions of the torque converter and planetary gear box type inasmuch as it is possible to test the gears to detect any defects therein or slippage of the direct drive clutch associated therewith. It is manifest that if the torque converter were attached thereto the slippage incident to such torque converter would obviate testing of any of these defects. Also by driving the oil pump of the transmission casing it is possible to check distribution of oil through the hydraulic system and to the gears at the proper pressure. In transmissions of the type having a governor controlled planetary gear set, shifting of the transmissions at the proper output shaft speed can easily be determined. If the torque converter unit were attached to the transmission casing this would be impossible.

Having thus described the invention what is claimed as new and desired to be secured by Letters Patent is:

1. In apparatus for testing automatic transmissions of the type having a plurality of relatively telescoped, independently rotatable elements and a fluid pump driven by a first element wherein rotation of a second element at a constant speed causes rotation of other of the elements at a variable speed, a frame adapted for mounting the transmission thereon; an elongated, tubular member adapted to surround said elements and including means for engaging said first and second elements to thereby interconnect the same; and power means on said frame and operably coupled with said member for rotating the latter at a predetermined constant speed thereby initiating variable speed rotation of said other of the elements and pressurized flow of fluid to the transmission.

2. In apparatus for testing automatic transmissions of the type having a first rotatable element connected to a fluid pump, a fixed second element telescoped within said first element, and an externally splined, third rotatable element telescoped within said second element wherein rotation of said third element at a constant speed causes rotation of other of the elements at a variable speed, a frame adapted to mount the transmission thereon; an elongated cylinder adapted to surround said elements and including structure for engaging said first element and having internal splines therein adapted to intermesh with said splines of the third element; and power means on the frame connected to said cylinder for rotating the latter at a predetermined constant speed thereby initiating variable speed rotation of said other of the elements and pressurized flow of fluid to the transmission.

3. In apparatus for testing automatic transmissions of the type having a first rotatable element connected to a fluid pump, a fixed second element telescoped within said first element and extending therebeyond, and a third rotatable element telescoped within said second element and extending therebeyond wherein rotation of said third element at a constant speed causes rotation of other of the elements at a variable speed, an elongated, horizontal frame having an upright plate intermediate the ends thereof, said plate being provided with an opening therethrough; a hollow cylinder attached to the plate with its axis concentric with the axis of said opening and adapted for mounting the transmission thereon with the axis of said third element being concentric with the axis of said cylinder; a sleeve within the cylinder and adapted to encircle certain of said elements in concentric relationship, said sleeve having one end thereof extending through the opening and having means therein for interconnecting said first and third elements, there being provided a bearing surface in the end of said cylinder adjacent said opening for rotatably supporting the sleeve; a tubular member removably secured to said one end of the sleeve; a shaft rotatably carried by the frame and attached to said member; power means on the frame operably coupled with said shaft for rotating the same at a predetermined constant speed thereby initiating variable speed rotation of said other of the elements and pressurized flow of fluid to the transmission; and flywheel means adapted to be mounted on said other elements.

4. In apparatus for testing automatic transmissions of the type having a plurality of relatively telescoped, independently rotatable elements wherein rotation of a first element at a constant speed causes rotation of a second element at a variable speed and rotation of a third element at a constant speed causes rotation of other of the elements at a variable speed, a frame adapted for mounting the transmission thereon; tubular structure for interconnecting said second and third elements; a sleeve adapted to engage said first element and to rotate independently of said structure; and means on said frame and connected to said sleeve for rotating the latter at a predetermined constant speed thereby initiating variable speed rotation of the structure and said other of the elements.

5. In apparatus for testing automatic transmissions of the type having a plurality of externally splined elements including a first rotatable input element, a second rotatable input element telescoped with said first element and extending therebeyond, a third rotatable element telescoped within said second element and extending therebeyond, and an output element wherein rotation of said first element at a constant speed causes rotation of said second element at a variable speed and rotation of said third element at a constant speed causes variable speed rotation of the output element, a frame adapted for mounting the transmission thereon; a sleeve adapted to encircle said elements and including means for engaging the splined portion of said first element; a tubular member telescoped within said sleeve and adapted to rotate independently of the latter, said member being adapted to encircle said second and third elements and including means for engaging the splined portions thereof; and means carried by the frame and operably coupled with said sleeve for rotating the latter at a predetermined constant speed thereby initiating variable speed rotation of said output element.

6. In apparatus for testing automatic transmissions of the type having a plurality of externally splined elements including a first rotatable input element, a second rotatable input element telescoped within said first element and extending therebeyond, a third rotatable element telescoped within said second element and extending therebeyond, and an output element wherein rotation of said first element at a constant speed causes rotation of said second element at a variable speed and rotation of said third element at a constant speed causes variable speed rotation of the output element, an elongated, horizontal frame having an upright plate intermediate the ends thereof adapted for mounting the transmission thereon and being provided with an opening therethrough for receiving said input elements; a sleeve adapted to encircle said elements and including means for engaging the splined portion of said first element within the opening; a tubular member telescoped within the sleeve and adapted to rotate independently of the latter, said member being adapted to encircle said second and third elements and including means for engaging the splined portions thereof; an elongated shaft rotatably carried by the frame and having its longitudinal axis in alignment with the axes of said element; a flange secured to one end of said shaft and removably attached to said sleeve; and a prime mover operably coupled to the shaft for driving the same at a predetermined constant speed thereby initiating variable speed rotation of said other of the elements.

7. Apparatus for testing automatic transmissions of the type having a plurality of coaxial, relatively telescoped first elements and a series of second elements coupled with the first elements through a variable speed gear train, said first elements including a drive element and a fluid pump element rotatable relative to other of said first elements and wherein rotation of said drive element and the pump element at a constant speed causes rotation of a fluid pump at said constant speed and rotation of said second elements at a variable speed, said apparatus comprising a frame adapted for mounting the transmission thereon; tubular structure adapted to surround all of said first elements and including means engaging only said drive element and the fluid pump element while clearing the remaining first elements; and a variable speed prime mover on said frame and operably coupled with said structure for rotating the latter at a variable speed thereby initiating pressurized flow of fluid through the transmission and variable rotation of said second elements relative to said first elements.

References Cited in the file of this patent

UNITED STATES PATENTS

| | | |
|---|---|---|
| 2,371,607 | Collins | Mar. 20, 1945 |
| 2,388,425 | Lund | Nov. 6, 1945 |
| 2,440,055 | Matulaitis | Apr. 20, 1948 |
| 2,627,189 | McFarland | Feb. 3, 1953 |

FOREIGN PATENTS

| | | |
|---|---|---|
| 83,825 | Austria | May 10, 1921 |